US012676798B2

(12) United States Patent
Burger et al.

(10) Patent No.: US 12,676,798 B2
(45) Date of Patent: Jul. 7, 2026

(54) METHOD FOR MANAGING PERFORMANCE IN A DISTRIBUTED SYSTEM WITH A BROKER-BASED PUBLISH-SUBSCRIBE ARCHITECTURE

(71) Applicants: Robert Bosch GmbH, Stuttgart (DE); CARNEGIE MELLON UNIVERSITY, Pittsburgh, PA (US)

(72) Inventors: Andreas Burger, Weingarten (DE); Anthony Rowe, Pittsburgh, PA (US); Arne Hamann, Ludwigsburg (DE); Dakshina Narahari Dasari, Renningen (DE); Fedor Smirnov, Erlangen (DE); Franz-Josef Grosch, Darmstadt (DE); Nuno Pereira, Pittsburgh, PA (US); Shruti Lall, Pittsburgh, PA (US)

(73) Assignees: ROBERT BOSCH GMBH, Stuttgart (DE); CARNEGIE MELLON UNIVERSITY, Pittsburgh, PA (US)

( * ) Notice: Subject to any disclaimer, the term of this patent is extended or adjusted under 35 U.S.C. 154(b) by 35 days.

(21) Appl. No.: 18/822,544

(22) Filed: Sep. 3, 2024

(65) Prior Publication Data

US 2025/0080428 A1     Mar. 6, 2025

(30) Foreign Application Priority Data

Sep. 6, 2023     (DE) ..................... 10 2023 208 594.1

(51) Int. Cl.
H04L 41/14          (2022.01)
H04L 41/0233     (2022.01)
(Continued)

(52) U.S. Cl.
CPC .......... *H04L 41/14* (2013.01); *H04L 41/0233* (2013.01); *H04L 41/12* (2013.01); *H04L 41/5009* (2013.01)

(58) Field of Classification Search
None
See application file for complete search history.

(56) References Cited

U.S. PATENT DOCUMENTS

2008/0299947 A1 * 12/2008 Litttle ..................... G06F 9/546
                                                                 455/412.1
2009/0086688 A1 *   4/2009 Kvache .............. H04L 65/1073
                                                                 370/338
(Continued)

*Primary Examiner* — Raqiul A Choudhury
(74) *Attorney, Agent, or Firm* — NORTON ROSE FULBRIGHT US LLP

(57)          ABSTRACT

A method for managing performance in a distributed system with a broker-based publish-subscribe architecture. The method includes: determining at least one performance requirement of the distributed system on the basis of a network state of the distributed system, wherein the network state is specific to a traffic and/or execution performance of the distributed system; identifying a significant event, wherein the significant event describes a change in the distributed system; changing the distributed system on the basis of the significant event; determining a new network state of the changed distributed system; analyzing the new network state with reference to the at least one performance requirement of the distributed system; carrying out at least one countermeasure depending on a result of the analysis. A computer program, a device, and a storage medium are also described.

12 Claims, 3 Drawing Sheets

(51)  Int. Cl.
     H04L 41/12          (2022.01)
     H04L 41/5009     (2022.01)

(56)             References Cited

U.S. PATENT DOCUMENTS

| | | | |
|---|---|---|---|
| 2011/0289329 A1* | 11/2011 | Bose | G06F 1/329 |
| | | | 713/320 |
| 2016/0028855 A1* | 1/2016 | Goyal | H04L 43/10 |
| | | | 709/203 |
| 2016/0337169 A1* | 11/2016 | Chhabra | H04L 45/28 |
| 2023/0216732 A1* | 7/2023 | Liu | H04L 67/146 |
| | | | 709/220 |

* cited by examiner

METHOD FOR MANAGING PERFORMANCE IN A DISTRIBUTED SYSTEM WITH A BROKER-BASED PUBLISH-SUBSCRIBE ARCHITECTURE

CROSS REFERENCE

The present application claims the benefit under 35 U.S.C. § 119 of German Patent Application No. DE 10 2023 208 594.1 filed on Sep. 6, 2023, which is expressly incorporated herein by reference in its entirety.

FIELD

The present invention relates to a method for managing performance in a distributed system with a broker-based publish-subscribe architecture. The present invention further relates to a computer program, a device, and a storage medium for this purpose.

BACKGROUND INFORMATION

Message-oriented communication and an RPC (remote procedure call) can be commonly used communication patterns in distributed systems. However, there can be some important differences between the two that can improve message-oriented communication for distributed applications.

The first difference can be that message-oriented communication is asynchronous, meaning that the sender may not have to wait for a response from the recipient. An RPC, on the other hand, can be synchronous, meaning that the sender may have to wait for a response from the recipient before continuing its operation. A second difference can be resilience. If a recipient is temporarily unavailable, message-oriented communication allows messages to be queued and delivered later, thus ensuring that no messages are lost. An RPC, on the other hand, can fail if the recipient is unavailable or if there are network problems. A third difference can be scalability. Messages can be distributed across multiple edge devices in a message-oriented architecture, thereby allowing horizontal scaling, while an RPC can be limited to a single edge device. A fourth difference can be loose coupling. In a message-oriented architecture, the sender and recipient may not need to know anything about each other's implementation details, and messages can be sent between different platforms and programming languages. In contrast, an RPC can require the sender and recipient to share a common interface and may be restricted to a specific programming language. Accordingly, in modern distributed systems, a message-oriented architecture, such as message buses, can be used to support different message delivery platforms, provide message delivery guarantees, and simplify communication. A common communication pattern called pub-sub (publish-subscribe) can facilitate the exchange of information between data producers (publishers) and consumers (subscribers). One way to implement pub-sub can be to allow publishers to pass their data through a message broker (or set of message brokers). In a pub-sub system, publishers can send messages to a broker without knowing who will consume them, while subscribers can express their interest in specific topics or types of messages without knowing who publishes them. The broker can act as an intermediary, receiving messages from publishers and forwarding them to subscribers on the basis of their interests.

Pub-sub mechanisms are very popular due to their flexibility and ability to decouple sender and recipient, thereby allowing communication endpoints to communicate without knowing each other's address and to carry out asynchronous message passing. Additionally, in distributed pub-sub architectures, users and data can be load-balanced across distributed edge devices in order to support scalability and fault tolerance across large-scale networks. Broker-based pub-sub can be a standard implementation of pub-sub that can use techniques and standard components such as brokers, libraries, application frameworks that can be in use in various ways in the Internet of Things (IoT) and cloud services. This can be relevant in an edge cloud orchestration framework, where distributed applications can be managed across different IP networks. Pub-sub can also allow interoperability with other applications communicating over the same protocol. Pub-sub can also prevent addressing and naming resolution problems and can facilitate a transparent deployment of application components across the edge and cloud. Because the broker can act as a centralized control point for the messaging system, it can allow easier administration and monitoring of the system.

Most pub-sub architectures and implementations can operate on a best-effort basis. They may not have provisions in place to somehow handle time-critical traffic: brokers can treat all messages similarly, without traffic differentiation and without the principle of guaranteed service. Quality of service in existing pub-sub systems may be limited to delivery guarantees, for example that a message is delivered at least once or once at most. Even when time-critical traffic is considered, existing approaches tend to offload the responsibility for timely message delivery to the communication infrastructure and can map subscriber interest onto multicast groups. This solution may lack the flexibility of standard pub-sub implementations that use brokers because in traditional pub-sub multicast groups may not map accurately to interest management mechanisms that can handle complex filtering with regard to topics and data content. They can also be difficult to set up across different subnetworks, especially when separate entities or organizational units manage them.

SUMMARY

The present invention provides a method, a computer program, a data processing device, and a computer-readable storage medium. Example embodiments, features, and details of the present invention are disclosed herein. Features and details described in the context of the method according to the present invention also correspond to the computer program according to the present invention, the data processing device according to the present invention, and the computer-readable storage medium according to the present invention, and vice versa in each case.

According to one aspect of the present invention, a method is provided for managing performance in a distributed system with a broker-based publish-subscribe architecture, comprising the following steps, wherein the steps are preferably performed successively and/or repeatedly:

determining at least one performance requirement of the distributed system on the basis of a network state of the distributed system, wherein the network state is specific to a traffic and/or execution performance of the distributed system, identifying a significant event, wherein the significant event describes a change in the distributed system, changing the distributed system on the basis of the significant event, determining a new network state of the changed distributed system, analyzing the new network state with respect to the at least one performance requirement of the distributed system, carrying out at least one countermeasure depending on a result of the analysis.

A broker-based publish-subscribe architecture can be a type of distributed system in which messages are produced by certain parts of the distributed system ("publishers") and consumed by other parts of the system ("subscribers"). This type of distributed system specifically involves an intermediary known as a broker that can handle the routing of messages. The "publishers" can create messages and send them to the broker without knowing who will receive them, which can be referred to as "publishing." The "subscribers" can express interest in certain types of messages through a process known as "subscribing." To do this, you can inform the broker of your interest, typically through some kind of filtering mechanism. This can be implemented via named topics. Subscribers can then generally recognize which topics they are interested in. The broker can then receive published messages and distribute them to all interested subscribers on the basis of their subscriptions. In one example embodiment of the present invention, a commodity or COTS broker is used that does not provide differentiated services. This type of broker may not be able to change any internal behavior of the broker itself because it is source-locked and only the binary file is available. This type of architecture can decouple publishers from subscribers, which means in particular that publishers do not need to know who their subscribers are and vice versa. This advantageously allows the distributed system to become very scalable, since publishers or subscribers can be added or removed without affecting the other publishers or subscribers. The distributed system can in addition comprise an orchestrator that can be configured to provide the deployment and management of modules across different runtimes of edge devices of the distributed system according to the at least one performance requirement of the distributed system. In other words, the significant event describing a change can indicate that the significant event is specific to a change that the distributed system may need to make as a result of the significant event. The at least one performance requirement can be, for example, an end-to-end latency of the particular at least one application, in particular of each application, of the distributed system, or a defined end-to-end latency of the at least one application, in particular of each application. The defined end-to-end latency of the at least one application can be a property of the at least one application that can be defined by a user or by a specification of the at least one application. The end-to-end latency can be affected by an execution time of application module components, transmission delays in a distributed system network, and delays within the distributed system broker. Another example of a performance requirement would be broker throughput. Analyzing the new network state can be performed by a designated module, which can be called a helper module. For applications already in use in the distributed system, analyzing the new network state can include checking whether additional traffic load due to the significant event, for example a new application, may negatively impact the performance of existing applications already running in the distributed system. The analysis can take into account the current traffic the broker is handling, its processing rate, and can also perform an admission check as to whether any incoming application will adversely affect the performance of existing applications. Furthermore, the affected applications, edge devices and connections can be identified and reported so that at least one countermeasure can be taken accordingly. The method comprising at least the steps described above may be advantageous in order to be able to manage and optimize the performance of the distributed system.

According to an example embodiment of the present invention, it is possible that the significant event is a request for deployment of a new application in the distributed system, wherein at least one property of the new application is defined. The at least one property can be appended as an additional performance requirement to the at least one performance requirement of the distributed system. The at least one property can be, for example, an application topology, details on how the new application can be divided into modules, communication that takes place between module components of the new application, such as messages that are published and subscribed. Additionally, the at least one property can include a location and resources, such as network, computation, or inputs/outputs, required by the modules of the new application, and an end-to-end latency of the new application.

According to an example embodiment of the present invention, the method can further comprise the following step:

deploying at least one module of the new application on at least one edge device of the distributed system, taking into account at least one performance requirement of the distributed system.

According to an example embodiment of the present invention, deploying the at least one module on the at least one edge device can indicate that the module is deployed on a runtime of the at least one edge device. An application can generally comprise a variety of modules, which in turn can be deployed on a variety of edge devices of the distributed system. The at least one performance requirement preferably comprises the at least one property of the new application, so that the deployment of the at least one module is also carried out taking into account the at least one property of the new application.

According to an example embodiment of the present invention, the at least one countermeasure can comprise the following step:

deploying the at least one module of the new application on another edge device of the distributed system, taking into account at least the one performance requirement of the distributed system.

Deploying the at least one module of the new application on the other edge device of the distributed system can be advantageous in that different configurations of the module components of the new application can be tested in order to find a configuration of the distributed system that meets the at least one performance requirement of the distributed system.

In another example embodiment of the present invention, the at least one countermeasure includes the following step:

deploying at least one module of an existing application of the distributed system on another edge device of the distributed system while taking into account the at least one performance requirement of the distributed system.

At least one property can also be defined for the existing application. The at least one property of the existing application can be, for example, an application topology, details of how the existing application can be divided into modules, communication that takes place between module components of the existing application, such as messages that are published and subscribed. Additionally, the at least one property can include a location and resources, such as network, computation, or inputs/outputs, required by the modules of the existing application, and an end-to-end latency of the existing application. Deploying the at least one module of the existing application on the other edge device of the distributed system can also be advantageous in that different configurations of the module components of the existing application can be tested to find a configuration of the distributed system that meets the at least one performance requirement of the distributed system.

According to an example embodiment of the present invention, it is possible that the method further comprises the following steps:

calculating an end-to-end latency, in particular an analytic end-to-end latency, of the new application and of an available slack, wherein the available slack is specific to a difference between the end-to-end latency of the new application and a required end-to-end latency of the new application, wherein the required end-to-end latency is defined by the at least one property of the new application, modifying a rate of outgoing messages from module components of the new application depending on the calculated available slack.

These steps, i.e., calculating the end-to-end latency and modifying the outgoing message rate, can be performed by at least one runtime of a relevant edge device on which the module components are deployed. By modifying the rate of outgoing messages, the traffic of the distributed system can advantageously be shaped in a precise and differentiated manner. As a result, the at least one performance requirement can be met due to the shaping of the traffic means by the modification of the rate of outgoing messages. Modifying the rate of outgoing messages can involve applying rate-limiting parameters. Some examples of such rate-limiting parameters would be a number of messages transmitted in a time window or a maximum input/output bandwidth or capacity utilization of a module. Furthermore, a message delivery or transmission of a given module can be postponed by a preset number of time units. Outgoing messages can also be reordered according to priorities. Different traffic priorities can be assigned to modules in the same runtime, for example by always placing best-effort traffic behind any real-time traffic.

In another example embodiment of the present invention, the at least one countermeasure includes the following step:

initiating an output of a notification, the notification indicating that the at least one performance requirement of the distributed system is not met.

The notification can be output to a user interface so that a user can advantageously initiate a countermeasure accordingly.

According to an example embodiment of the present invention, the network state can include at least one of the following factors:

a current traffic injected by the module components in the distributed system, the network topology of the distributed system, a network service rate of the distributed system, a throughput of a broker of the distributed system.

The network topology can include a description of connections between modules in the distributed system. The network service rate can be a bandwidth available in the distributed system. The broker throughput can also be referred to as the broker service rate. The network state can also include individual execution times of the module components of the distributed system and individual transmission times between module components of the distributed system. Other factors would be a cumulative execution time of all module components of the distributed system and a cumulative transfer time between all module components of the distributed system. It can be beneficial to evaluate these factors if the at least one performance requirement can be met.

According to an example embodiment of the present invention, the determination of the network state of the distributed system can include the following step:

performing an analysis of a throughput of a broker of the distributed system, wherein a minimum, an average and a worst-case throughput of the broker are determined under a combination of different settings.

The different settings can include varying a packet injection rate, a size of messages, message delivery settings, or a number of subscribers. This can advantageously allow a more differentiated analysis of the network state. As a result, it can advantageously be determined more precisely whether the at least one performance requirement of the distributed system is met.

According to an example embodiment of the present invention, the distributed system can include at least two brokers. Providing more than one broker can advantageously improve the performance of the distributed system.

According to an example embodiment of the present invention, the method can further comprise the following step:

clustering application components of the distributed system in order to form in each case one broker of the at least two brokers, wherein the clustering is carried out with reference to the at least one performance requirement of the distributed system.

According to an example embodiment of the present invention, it is possible that in each case one broker of the at least two brokers is designated to make arrangements for a corresponding requirement of the distributed system. For example, one of the at least two brokers can provide that a real-time execution of an application be enabled as a performance requirement of the distributed system.

In another aspect of the present invention, a computer program can be provided, in particular a computer program product, comprising instructions which, when the computer program is executed by a computer, cause the computer to carry out the method according to the present invention. The computer program according to the present invention can thus have the same advantages as described in detail with reference to a method according to the present invention.

In another aspect of the present invention, a data processing device can be provided which is designed to carry out the method according to the present invention. As the device, for example a computer can be provided which executes the computer program according to the present invention. The computer can comprise at least one processor that can be used to execute the computer program. In addition, a non-volatile data memory can be provided in which the computer program can be stored and from which the computer program can be read by the processor for execution.

According to another aspect of the present invention, a computer-readable storage medium can be provided that comprises the computer program according to the present invention and/or instructions which, when executed by a computer, cause the computer to carry out the steps of the method according to the present invention. The storage medium can be formed as a data storage device, such as a hard disk and/or a non-volatile memory and/or a memory card and/or a semiconductor drive. The storage medium can be integrated into the computer, for example.

Furthermore, the method according to the present invention can be implemented as a computer-implemented method.

Further advantages, features and details of the present invention can be found in the following description, in which example embodiments of the present invention are described in detail with reference to the figures. In this context, the features disclosed herein can be essential to the present invention, individually or in any combination.

DETAILED DESCRIPTION OF EXAMPLE EMBODIMENTS

Figure 1:
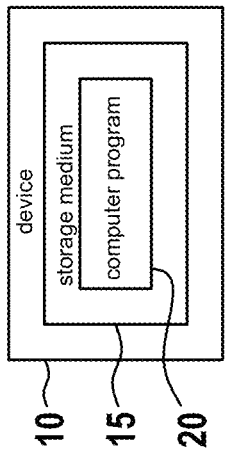
FIG. 1 shows a method, a computer program, a storage medium, and a device according to example embodiments of the present invention.
Figure 1:
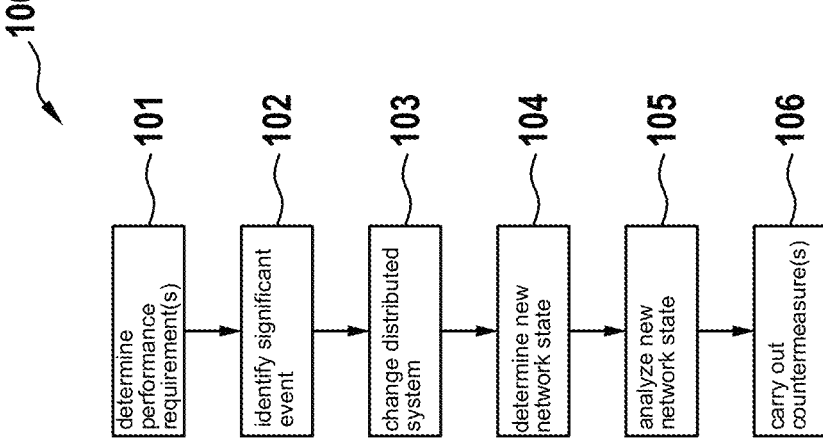

FIG. 1 shows a computer program 20, a storage medium 15 and a device 10 according to example embodiments of the present invention.

FIG. 1 further shows a method 100 for managing performance in a distributed system 1 with a broker-based publish-subscribe architecture according to embodiments of the present invention. In a first step 101, at least one performance requirement of the distributed system 1 is determined on the basis of a network state of the distributed system 1. The network state can be specific to a traffic and/or execution performance of the distributed system 1. In a second step 102, a significant event is identified. The significant event can describe a change in the distributed system 1. In a third step 103, the distributed system 1 is changed on the basis of the significant event. In a fourth step 104, a new network state of the changed distributed system 1 is determined. In a fifth step 105, the new network state is analyzed with respect to the at least one performance requirement of the distributed system 1. In a sixth step 106, at least one countermeasure is carried out depending on a result of the analysis 105.

Figure 2:
FIG. 2 shows a distributed system with a broker according to example embodiments of the present invention.
Figure 2:
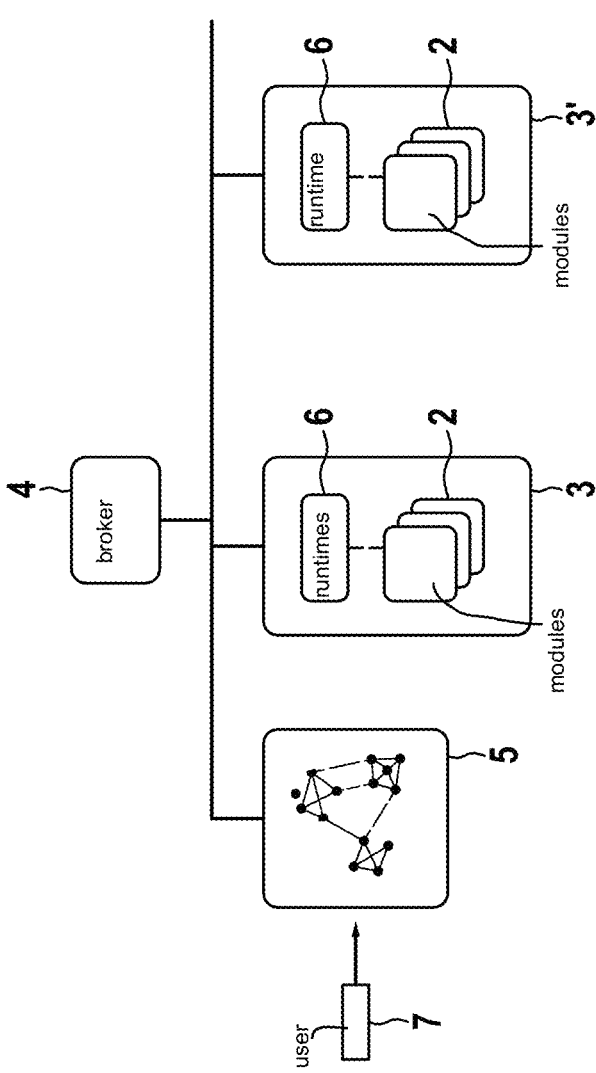

FIG. 2 shows a distributed system 1 with a broker 4 according to embodiments of the present invention. The distributed system 1 in FIG. 2 further comprises an edge device 3 and another edge device 3', in each case with runtimes 6 and modules 2 deployed therein. The distributed system 1 in FIG. 2 further comprises an orchestrator 5. Furthermore, FIG. 2 schematically shows that an input from a user 7 can be provided to the orchestrator 5.

Figure 3:
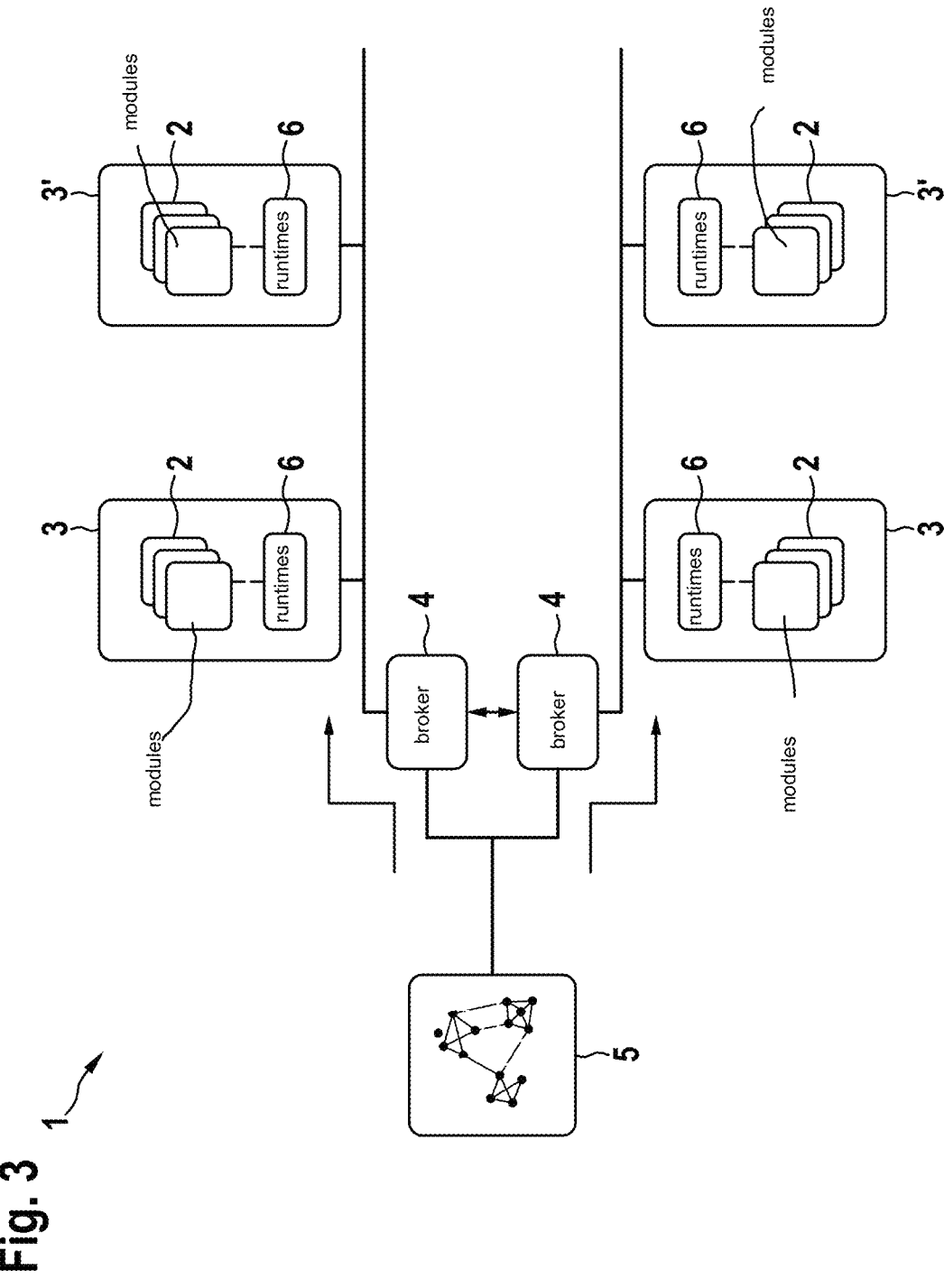
FIG. 3 shows a distributed system with two brokers according to example embodiments of the present invention.

FIG. 3 shows a distributed system 1 with two brokers 4 according to embodiments of the present invention. The distributed system 1 in FIG. 3 further comprises, for each of the brokers 4, an edge device 3 and another edge device 3', in each case with runtimes 6 and modules 2 deployed therein. The distributed system 1 in FIG. 3 further comprises an orchestrator 5. According to embodiments of the present invention, one of the brokers 4 can be provided for real-time traffic streams and the other broker 5 for best-effort traffic streams.

In a distributed environment, the end-to-end latency of an application can be affected by a plurality of factors. These factors include an execution time of module components 2 in the host edge devices 3, transmission delays in a network, and delays in a broker 4. Because the broker 4 can act as an intermediary for all applications, it can appear as a significant bottleneck and negatively impact application latency. However, implementing enhanced QoS (quality of service) in commodity brokers 4 can be problematic. This can be because it may require the broker 4 to track the QoS requirements of application streams, differentiate traffic streams, and prioritize them. Consequently, broker-based solutions can often use a simple first-in-first-out (FIFO) mechanism to handle requests and limit their functionality to the publishing of packages to interested subscribers.

The present invention can provide a mechanism for broker-based pub-sub networks that can provide quality of service (QoS) guarantees relating to end-to-end timing by shaping the traffic sent toward the broker 4, and may not require any modifications of the broker 4.

One aspect in the context of the present invention can be a mechanism that ensures specific timing guarantees for a group of applications that communicate using pub-sub via a standard broker 4 (commodity/standard). This mechanism can be implemented by means of an application management framework, which can include runtime components that can be deployed in distributed edge devices 3 and a specialized orchestrator 5. Each runtime component can be responsible for executing and hosting application executables, which can be referred to as module 2, on the edge device 3 on which the runtime is deployed, as well as enforcing the allocation of computing resources of the edge device 3 to the individual modules 2. The orchestrator 5, on the other hand, can be responsible for performing admission control for new applications to be deployed and for finding a mapping of modules to runtime and system configuration (edge device 3 and network) that can be guaranteed to meet the QoS requirements of all applications. Furthermore, the orchestrator 5 can be responsible for reconfiguring the system to respond to dynamic events, such as a deployment of a new application or termination of a running application.

The orchestrator 5 can have a global view of the distributed system 1 and can know locations of the various modules 2, the topics they publish and subscribe to, and the data that flow between them. In addition, the orchestrator 5 is able to understand real-time requirements of the applications. With this information, the orchestrator 5 can make informed decisions about how to allocate resources and shape traffic streams in order to ensure that the system meets its real-time requirements.

In the proposed approach, the specialized orchestrator 5 can ensure timing guarantees by first profiling the service rate of the commodity standard broker 4, monitoring network conditions, intelligently deploying applications, and controlling the outgoing traffic from each of the runtimes (i.e., traffic shaping) to ensure that the end-to-end requirements of applications can be guaranteed. If multiple brokers 4 are used, the orchestrator 5 can also map messages (topics or content) to specific brokers 4 in order to thus optimally influence network traffic and application performance.

The proposed edge orchestration framework 5 includes the following components, as shown in FIG. 2.

The orchestrator 5, which can play a role in deploying and managing modules 2 over different runtimes according to the specific requirements of the application. In order to gather information about the application, the orchestrator 5 can read an application manifest, in which a user can specify an application topology and details about how the application can be divided into different modules 2, as well as a communication that occurs between them, such as the messages that are published and subscribed to. In addition, the application manifest can include other requirements, such as a location and resources (network, computing, I/O (input/output)) required by the application modules 2, end-to-end timing requirements, the number of duplicates required, and availability requirements. The orchestrator 5 can have a comprehensive understanding of the network topology, including the edge devices 3 and connections, as well as the available runtimes on which the application modules 2 can be deployed. By reading the application manifest, the orchestrator 5 can deploy the various application modules 2 at appropriate runtimes in order to meet the timing requirements of the application.

Each of the edge devices 3 can be equipped with a runtime that can create a secure and isolated execution environment that can include built-in security checks. The runtime can also manage internal resource reservations for the edge devices 3 and can abstract away the operating system and hardware. Initially, all runtimes can register with the orchestrator 5 and send periodic updates regarding the available resources on this edge device 3 as well as the deployed modules 2 and their current life cycle status. In addition, the runtime can enforce any commands sent by the orchestrator 5, such as starting or deleting modules 2. At startup, the runtime can register with the broker 4, and all applications hosted on the same runtime can inherit the same broker 4. This means in particular that all message communication can be redirected via the broker 4. In addition, the runtime can be responsible for enforcing the traffic shaping parameters sent by the orchestrator 5.

A message broker 4 can act as an intermediary, by means of which senders and recipients and the list of publishers and subscribers registered for each topic are decoupled. The broker 4 can send published messages to interested subscribers. A standard or commodity off-the-shelf (COTS) broker 4 can be assumed, which can ensure delivery guarantees according to the required QoS, but may not have mechanisms for differentiated service for specific streams or any timing-related guarantees.

In the following, a method according to embodiments of the present invention is described. In a first step, an offline analysis of the service rate of broker 4 can be performed. The first step in the process can be to analytically and experimentally profile the service rate of the broker 4. This can be done in order to determine a minimum, average and worst-case throughput of the broker 4 under a combination of different settings. The settings can include varying a packet injection rate, a message size, message delivery settings, or a number of subscribers.

Experiments can be conducted to synthetically generate traffic patterns in order to try out all of the above scenarios. Finally, a maximum delay that a broker 4 can have in serving a request can be calculated, which in particular depends on various factors, including characteristics of the request itself, such as publication rate, message size and number of subscribers involved, a processing method used by the broker 4, such as whether one or multiple threads are involved, a size of the buffer in the broker 4 and/or a number of unprocessed requests already present in the broker 4 when the request in question arrives.

The following describes in more detail which steps the orchestrator 5 can carry out for each significant event. A significant event can be an arrival of a new application deployment request, an event informing about a network load change (beyond a defined threshold), a completion of an application deployment request, a registration of a new runtime, the time at which a runtime is disconnected, or a modification of a frequency of periodic messages.

The application can specify its deployment requirements via the application manifest as described above. The goal of the orchestrator 5 can be to place the application modules 2 on appropriate edge devices so as to satisfy placement and timing constraints of the incoming application, while also preserving the timing guarantees provided to other existing applications. To do this, the orchestrator 5 can perform the following steps.

In a first step, the orchestrator 5 can check end-to-end application timing requirements, dependencies of the modules 2, and message communication requirements, such as a publishing rate, a message size, and a number of subscribers.

In a second step, the orchestrator 5 can perform an authorization test. This test can substantially answer the questions whether the modules 2 of this application will be deployed on specific edge devices 3, what the additional network load imposed is, and whether this network load will adversely affect the timing behavior of existing applications. The orchestrator 5 can attempt to find an initial deployment or mapping strategy to satisfy the basic application constraints and can then run the authorization test. The authorization test can attempt to map modules 2 with available network resources while taking into account constraints specified in the application manifest, such as an input and/or output of a module 2.

If no adverse performance on existing applications is determined, the existing deployment strategy can be maintained. If adverse performance on existing applications is determined, i.e. if the additional network load adversely affects the timing behavior of existing applications, the orchestrator 5 can use a combination of different countermeasures or strategies, which are described below.

According to a first countermeasure, the orchestrator 5 can map the application modules 2 to different edge devices 3 and re-run the authorization test.

The authorization test can also return the network load information on a connection-by-connection basis so that, according to a second strategy, the orchestrator 5 can use this information to make alternative mapping decisions.

If modules 2 of existing applications can be migrated to different edge devices 3 while still meeting the deadline specified in the application manifest, the incoming application modules 2 can be placed there instead.

For the given incoming application and the given deployment strategy, an analytical end-to-end latency of the application and an available slack, i.e. a difference between a required end-to-end latency of the application and the current one, can be calculated. If the slack is positive, the runtime can shape an outgoing rate of messages from this application 6 to send them at a slower rate, in order to provide a second possible countermeasure. With this new setting, the authorization test can be re-run. For runtimes hosting applications that do not have strict timing requirements, the outgoing traffic parameters can be limited; that is to say, the number of outgoing messages in the time interval can be reduced, in successive steps, and the authorization test can be re-run. This can reduce the network load on the network.

If the application cannot be deployed after several of the above countermeasures have been tried out within a predefined time limit period, the orchestrator 5 can send a corresponding notification.

The procedure described above can be implemented under different scenarios that affect the overall traffic flow in the network or the network topology itself. This can include new runtime registrations, connection failures, crashes of the runtime or edge device 3, changes in the set of applications deployed, and the like.

To evaluate the suitability of an incoming application for deployment, the authorization test can be used. The authorization test can effectively use a helper module 2 that provides information about the load status of various network segments and links as well as a current service rate of the broker 4. The test can calculate the end-to-end latency of new applications as well as for already deployed, i.e. existing, applications. The calculation can be performed using formal timing analysis methods. For example, a tool can be used to model the network and traffic streams, and perform a compositional network analysis, reporting statistics such as network delays to the helper module 2.

For applications that are already deployed, i.e. existing applications, and that have strict timing requirements, the authorization test can check whether the additional traffic load from the new application can negatively impact the performance of existing applications already running on the system. It can identify any affected applications, edge devices 3 and connections and can report this information back to the orchestrator 5. The orchestrator 5 can then choose either to continue application deployment or to redeploy modules 2 on less loaded edge devices 3 in order to mitigate the degradation. The load and performance of the broker 4 can also be calculated, and if the functional capability threshold is exceeded the orchestrator 5 can send commands to enforce traffic shaping strategies for applications that have positive slack.

The runtime as described above can be responsible for enforcing traffic shaping parameters in addition to hosting a sandbox execution environment. All modules 2 deployed in an edge device 3 can run within the runtime of the edge device 3, and the runtime can in turn provide controlled access to resources such as files, a CPU, or a network of the edge device 3. All outgoing messages can be intercepted by the runtime. Furthermore, the runtime can apply rate-limiting parameters to outgoing traffic. Some examples are presented below. The number of messages transmitted in a time window can be limited. Module 2 X of application Y can be allowed to set k messages in a period of y ms. A maximum input/output bandwidth or utilization of a module 2 can be limited. A message delivery or transmission of a given module 2 can be offset by a predetermined number of time units. Outgoing messages can be reordered according to priorities. Within the same runtime, different traffic priorities can be assigned for the modules 2, for example by always placing best-effort traffic behind any real-time traffic leaving the runtime.

In addition to traffic shaping, the orchestrator 5 if available, can also request that the runtime use connection layer mechanisms to prioritize and/or enforce guarantees. This can be done as described below.

In networks based on standard Ethernet, the orchestrator can issue five commands to the runtime in order to assign a service tag class to outgoing messages. This can require that all network devices support IEEE 802.1P, which may be very common, and can allow the orchestrator 5 to enforce traffic differentiation at the runtime level, for example allowing provision of isolation between applications running on different edge devices 3. In Ethernet networks with TSN (time-sensitive networking), the orchestrator 5 can design the runtimes to exploit TSN, a set of standards that can allow time-sensitive communication over Ethernet networks. TSN is specifically designed to ensure guaranteed delivery of time-critical data and reduce network latency and jitter. This can be achieved by defining the set of required features, such as time synchronization, traffic shaping, and priority-based queuing, to ensure that time-sensitive traffic is delivered within a specified time frame and without interference from other non-time-sensitive traffic. In this case, TSN parameters can be dynamically configured by the orchestrator 5 to assist in traffic shaping with a COTS broker 4.

To scale the capacity of the system, brokers 4 can be clustered together using different configurations. In a first configuration, computing edge devices 3 in local edge networks can talk via an edge broker 4, which then talks to a central broker 4. The brokers 4 can be assigned to handle different classes of traffic in a single local network. Runtimes can then be registered with a suitable broker 4 by the orchestrator 5; the orchestrator 5 can either statically assign a runtime to a broker 4, or it can dynamically decide which broker 4 to use on the basis of the modules 2 deployed on it and the associated timing guarantees that have to be met. The runtime traffic shaping technique can also be applied in devices with multiple brokers 4 in order to achieve more complex traffic management and control.

In a first possible configuration, the central broker 4 can be responsible for allocating network resources based on the specific needs of each computing edge device 3, such as available bandwidth, latency requirements, and traffic volume. The helper module 2 can be responsible for detecting and resolving network congestion or failures by adjusting traffic flow and routing traffic along alternative network paths.

In the case of a single local edge network according to a second possible configuration, there could be two countermeasures or strategies. As a first countermeasure, the network can be statically partitioned. In this case, an orchestrator 5 can be responsible for partitioning the network into a plurality of subnetworks, each optimized for a specific type of traffic. For example, one subnetwork might be optimized for real-time traffic, while another subnetwork might be optimized for best-effort traffic. Each subnetwork can be assigned to a specific broker 4 that is responsible for handling traffic of the corresponding type. The orchestrator 5 can route traffic to the appropriate broker 4 based on the traffic type and the guidelines or rules that have been defined. For real-time traffic, the orchestrator 5 can also deploy real-time applications on specific edge devices 3 or runtimes optimized for low latency and high reliability. This can ensure that critical data are processed in a timely and accurate manner without being delayed or interrupted by other, non-real-time traffic.

According to a second strategy, the network can be dynamically partitioned. Thus, modules 2 are dynamically migrated to runtimes that are registered with a specific broker 4. This can be useful if the module 2 requires specific resources or capabilities that are only available on certain runtimes, or if the module 2 needs to be deployed in a subnetwork that is optimized for a specific type of traffic. Another strategy can be to keep the runtime on the edge device 3 and change the broker 4 with which it is registered. This can be useful when network conditions or traffic patterns change and it becomes necessary to route the module's traffic to another broker 4 that can better handle the traffic load or provide better performance.

The above description of the embodiments describes the present invention in the context of examples. Of course, individual features of the embodiments can be freely combined with each other as long as this is technically reasonable without departing from the scope of the present invention.

What is claimed is:

1. A method for managing performance in a distributed system with a broker-based publish-subscribe architecture, the method comprising the following steps:

determining at least one performance requirement of the distributed system based on a network state of the distributed system, wherein the network state is specific to a traffic and/or execution performance of the distributed system;

identifying an event, wherein the event describes a change in the distributed system including a request for a deployment of a new application in the distributed system;

changing the distributed system based on the event;

determining a new network state of the changed distributed system;

analyzing the new network state with respect to the at least one performance requirement of the distributed system; and carrying out at least one countermeasure depending on a result of the analysis, wherein carrying out the at least one countermeasure comprises:

determining an end-to-end latency of the new application and an available slack, wherein the available slack defines a difference between the end-to-end latency of the new application and a required end-to-end latency of the new application; and modifying a rate of outgoing messages from at least one module of the new application based on the available slack.

2. The method according to claim 1, wherein at least one property of the new application is defined, wherein the at least one property is appended as a further performance requirement to the at least one performance requirement of the distributed system to form a plurality of performance requirements of the distributed system, and wherein the method further comprises the following step:

deploying the at least one module of the new application on at least one edge device of the distributed system taking into account the plurality of performance requirements of the distributed system.

3. The method according to claim 2, wherein the at least one countermeasure comprises the following step:

deploying the at least one module of the new application on another edge device of the distributed system taking into account the plurality of performance requirements of the distributed system.

4. The method according to claim 2, wherein the at least one countermeasure includes the following step:

deploying at least one module of an existing application of the distributed system on another edge device of the distributed system taking into account the plurality of performance requirements of the distributed system.

5. A method for managing performance in a distributed system with a broker-based publish-subscribe architecture, the method comprising the following steps:

determining at least one performance requirement of the distributed system based on a network state of the distributed system, wherein the network state is specific to a traffic and/or execution performance of the distributed system;

identifying an event, wherein the event describes a change in the distributed system;

changing the distributed system based on the event;

determining a new network state of the changed distributed system;

analyzing the new network state with respect to the at least one performance requirement of the distributed system; and carrying out at least one countermeasure depending on a result of the analysis, wherein the event is a request for a deployment of a new application in the distributed system, wherein at least one property of the new application is defined, wherein the at least one property is appended as a further performance requirement to the at least one performance requirement of the distributed system to form a plurality of performance requirements of the distributed system, and wherein the method further comprises the following steps:

deploying at least one module of the new application on at least one edge device of the distributed system taking into account the plurality of performance requirements of the distributed system;

calculating an end-to-end latency of the new application and an available slack, wherein the available slack is specific to a difference between the end-to-end latency of the new application and a required end-to-end latency of the new application, wherein the required end-to-end latency is defined by the at least one property of the new application; and modifying a rate of outgoing messages from module components of the new application depending on the calculated available slack.

6. The method according to claim 1, wherein the at least one countermeasure comprises the following step:

initiating an output of a notification, the notification indicating that the at least one performance requirement of the distributed system is not met.

7. The method according to claim 1, wherein the network state includes at least one of the following factors:

a current traffic injected by module components in the distributed system, a network topology of the distributed system, a network service rate of the distributed system, or a throughput of a broker of the distributed system.

8. The method according to claim 1, wherein the determining of the network state of the distributed system includes the following step:

performing an analysis of a throughput of a broker of the distributed system, wherein a minimum, an average, and a worst-case throughput of the broker are determined under a combination of different settings.

9. The method according to claim 1, wherein the distributed system includes at least two brokers, and the method further comprises the following step:

clustering application components of the distributed system in order to form in each case one broker of the at least two brokers, wherein the clustering is carried out with reference to the at least one performance requirement of the distributed system.

10. A data processing device for managing performance in a distributed system with a broker-based publish-subscribe architecture, the data processing device comprising at least one processor configured to:

determine at least one performance requirement of the distributed system based on a network state of the distributed system, wherein the network state is specific to a traffic and/or execution performance of the distributed system;

identify an event, wherein the event describes a change in the distributed system including a request for a deployment of a new application in the distributed system;

change the distributed system based on the event;

determine a new network state of the changed distributed system;

analyze the new network state with respect to the at least one performance requirement of the distributed system; and carry out at least one countermeasure depending on a result of the analysis, wherein to carry out the at least one countermeasure includes to:

determine an end-to-end latency of the new application and an available slack, wherein the available slack defines a difference between the end-to-end latency of the new application and a required end-to-end latency of the new application; and modify a rate of outgoing messages from at least one module of the new application based on the available slack.

11. A non-transitory computer-readable storage medium on which are stored instructions for managing performance in a distributed system with a broker-based publish-subscribe architecture, the instructions, when executed by a computer, causing the computer to perform the following steps:

determining at least one performance requirement of the distributed system based on a network state of the distributed system, wherein the network state is specific to a traffic and/or execution performance of the distributed system;

identifying an event, wherein the event describes a change in the distributed system including a request for a deployment of a new application in the distributed system;

changing the distributed system based on the event;

determining a new network state of the changed distributed system;

analyzing the new network state with respect to the at least one performance requirement of the distributed system; and carrying out at least one countermeasure depending on a result of the analysis, wherein carrying out the at least one countermeasure comprises:

determining an end-to-end latency of the new application and an available slack, wherein the available slack defines a difference between the end-to-end latency of the new application and a required end-to-end latency of the new application; and modifying a rate of outgoing messages from at least one module of the new application based on the available slack.

12. The method according to claim 1, wherein the required end-to-end latency of the new application is comprised within an application manifest of the distributed system.

* * * * *